(12) United States Patent
Tanaka et al.

(10) Patent No.: US 7,243,391 B2
(45) Date of Patent: *Jul. 17, 2007

(54) CLEANING ARTICLE

(75) Inventors: Yoshinori Tanaka, Kannonji (JP); Akemi Tsuchiya, Kannonji (JP); Masatoshi Fujiwara, Kannonji (JP)

(73) Assignee: Uni-Charm Corporation, Ehime (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/234,040

(22) Filed: Sep. 23, 2005

(65) Prior Publication Data

US 2006/0016036 A1 Jan. 26, 2006

Related U.S. Application Data

(63) Continuation of application No. 10/957,552, filed on Oct. 1, 2004, which is a continuation of application No. 10/070,928, filed as application No. PCT/JP01/05840 on Jul. 5, 2001, now Pat. No. 6,813,801.

(30) Foreign Application Priority Data

Jul. 10, 2000 (JP) .............................. 2000-208756
Apr. 12, 2001 (JP) .............................. 2001-113750

(51) Int. Cl.
- A47L 13/12 (2006.01)
- A47L 13/20 (2006.01)
- A47L 13/38 (2006.01)

(52) U.S. Cl. ............... 15/229.3; 15/209.1; 15/226; 15/227; 15/229.1

(58) Field of Classification Search ............ 15/115, 15/209.1, 229.1, 229.3, 229.7, 226, 227
See application file for complete search history.

(56) References Cited

U.S. PATENT DOCUMENTS

| | | | |
|---|---|---|---|
| 823,725 A * | 6/1906 | Hayden | ............ 15/114 |
| 1,437,145 A * | 11/1922 | Johnson | ............ 15/210.1 |
| 1,542,108 A | 6/1925 | Taylor | |
| 3,316,612 A | 5/1967 | Stump | |
| 3,525,113 A | 8/1970 | Leland | |
| 3,822,435 A | 7/1974 | Moss | |
| 3,986,225 A | 10/1976 | Komatsu | |
| 5,115,535 A | 5/1992 | Casademunt Ferre et al. | |
| 5,315,734 A | 5/1994 | Kresse et al. | |
| 5,452,491 A | 9/1995 | Thompson | |
| 5,613,263 A | 3/1997 | Nolte | |

(Continued)

FOREIGN PATENT DOCUMENTS

CN 339271 9/1998

(Continued)

OTHER PUBLICATIONS

European Search Report for EP 05 02 0996 mailed Jan. 20, 2006.

(Continued)

Primary Examiner—Randall Chin
(74) Attorney, Agent, or Firm—Darby & Darby

(57) ABSTRACT

There is disclosed a cleaning article including a brush portion. The brush portion has a plurality of strips and at least one layer of a fiber bundle.

5 Claims, 9 Drawing Sheets

U.S. PATENT DOCUMENTS

| | | | |
|---|---|---|---|
| 5,715,560 A | 2/1998 | Banicki | |
| 5,953,784 A | 9/1999 | Suzuki et al. | |
| 6,047,435 A | 4/2000 | Suzuki et al. | |
| 6,119,298 A | 9/2000 | Kenmochi et al. | |
| 6,143,393 A * | 11/2000 | Abe et al. | 428/131 |
| 6,202,250 B1 | 3/2001 | Kenmochi et al. | |
| 6,241,835 B1 | 6/2001 | Abe et al. | |
| 6,245,413 B1 | 6/2001 | Kenmochi et al. | |
| 6,319,593 B1 | 11/2001 | Kenmochi et al. | |
| 6,329,308 B1 | 12/2001 | Kenmochi et al. | |
| 6,502,273 B1 | 1/2003 | Mihara et al. | |
| 6,506,472 B1 | 1/2003 | Tanaka et al. | |
| 6,554,937 B1 | 4/2003 | Kenmochi et al. | |
| 6,684,447 B2 | 2/2004 | Mihara et al. | |
| 6,774,070 B1 | 8/2004 | Kenmochi et al. | |
| 6,830,801 B1 | 12/2004 | Kenmochi et al. | |
| 2002/0148061 A1 | 10/2002 | Tanaka et al. | |
| 2003/0000357 A1 | 1/2003 | Tanaka | |
| 2006/0101601 A1 | 5/2006 | Fujiwara et al. | |

FOREIGN PATENT DOCUMENTS

| | | |
|---|---|---|
| CN | 1192129 A | 9/1998 |
| CN | 341500 | 10/1998 |
| CN | 351980 | 2/1999 |
| CN | 1221599 A | 7/1999 |
| CN | 394679 | 6/2000 |
| CN | 402079 | 8/2000 |
| CN | 413052 | 11/2000 |
| CN | 419401 | 1/2001 |
| CN | 463698 | 11/2001 |
| CN | 468463 | 12/2001 |
| CN | M274919 | 9/2005 |
| DE | 38 02 198 C2 | 6/1989 |
| DE | 297 01 349 U1 | 4/1997 |
| EP | 0 289 198 A1 | 11/1988 |
| EP | 0 358 844 B1 | 3/1990 |
| EP | 0 543 840 B1 | 6/1993 |
| EP | 0 739 600 A1 | 10/1996 |
| EP | 0 774 229 A2 | 5/1997 |
| EP | 0 777 997 A2 | 6/1997 |
| EP | 0 841 870 B1 | 5/1998 |
| EP | 0 848 927 A1 | 6/1998 |
| EP | 0 865 755 A1 | 9/1998 |
| EP | 0 953 314 A1 | 3/1999 |
| EP | 0 923 902 A2 | 6/1999 |
| EP | 0 937 509 A1 | 8/1999 |
| EP | 0 943 425 A1 | 9/1999 |
| EP | 0 968 677 A2 | 1/2000 |
| EP | 988823 A2 | 3/2000 |
| EP | 1 095 763 A1 | 5/2001 |
| EP | 1 113 099 A2 | 7/2001 |
| EP | 1 188 492 A1 | 3/2002 |
| EP | 1 201 175 A1 | 5/2002 |
| EP | 1 201 176 A1 | 5/2002 |
| EP | 1 201 177 A1 | 5/2002 |
| EP | 1 250 220 A1 | 10/2002 |
| EP | 1 250 220 B1 | 10/2002 |
| EP | 1 656 875 A2 | 5/2006 |
| EP | 1 656 876 A2 | 5/2006 |
| JP | 55-13570 | 1/1980 |
| JP | 58-194770 | 12/1983 |
| JP | 62-47351 | 3/1987 |
| JP | 1-79454 | 5/1989 |
| JP | 1-79455 | 5/1989 |
| JP | 1-79456 | 5/1989 |
| JP | 1-178859 | 12/1989 |
| JP | 2-4541 | 1/1990 |
| JP | 02-109531 | 4/1990 |
| JP | 05-192284 | 8/1993 |
| JP | 05-95457 | 12/1993 |
| JP | 5-509014 | 12/1993 |
| JP | 7-8432 | 1/1995 |
| JP | 7-23886 | 1/1995 |
| JP | 07-67821 | 3/1995 |
| JP | 8-215124 | 8/1996 |
| JP | 8-266455 | 10/1996 |
| JP | 3034285 | 11/1996 |
| JP | 08-336493 | 12/1996 |
| JP | 3034692 | 12/1996 |
| JP | 09-19396 | 1/1997 |
| JP | 09-19397 | 1/1997 |
| JP | 3036008 | 1/1997 |
| JP | 09-038009 A | 2/1997 |
| JP | 09-47416 | 2/1997 |
| JP | 09-47417 | 2/1997 |
| JP | 09-135798 | 5/1997 |
| JP | 09-149873 | 6/1997 |
| JP | 09-154791 A | 6/1997 |
| JP | 3040633 | 6/1997 |
| JP | 3043064 | 8/1997 |
| JP | 09-273037 | 10/1997 |
| JP | 3044823 | 10/1997 |
| JP | 09-299305 | 11/1997 |
| JP | 09-299306 | 11/1997 |
| JP | 09-299307 | 11/1997 |
| JP | 3045658 | 11/1997 |
| JP | 09-313416 | 12/1997 |
| JP | 09-322876 | 12/1997 |
| JP | 09-327429 | 12/1997 |
| JP | 10-005163 | 1/1998 |
| JP | 10-5164 | 1/1998 |
| JP | 10-014839 | 1/1998 |
| JP | 10-33443 | 2/1998 |
| JP | 10-43115 | 2/1998 |
| JP | 3047727 | 2/1998 |
| JP | 10-99246 | 4/1998 |
| JP | 10-99251 | 4/1998 |
| JP | 10-146306 A | 6/1998 |
| JP | 10-155713 | 6/1998 |
| JP | 10-201692 | 8/1998 |
| JP | 10-225409 | 8/1998 |
| JP | 10-235574 A | 9/1998 |
| JP | 10-258009 | 9/1998 |
| JP | 10-262888 | 10/1998 |
| JP | 10-328107 A1 | 12/1998 |
| JP | 10-328109 | 12/1998 |
| JP | 11-42193 | 2/1999 |
| JP | 11-42194 | 2/1999 |
| JP | 11-089776 A | 4/1999 |
| JP | 11-235301 A | 8/1999 |
| JP | 11-267078 | 10/1999 |
| JP | 11-276402 A | 10/1999 |
| JP | 11-290253 | 10/1999 |
| JP | 2000-83883 | 3/2000 |
| JP | 2000-093373 | 4/2000 |
| JP | 2000-201875 | 7/2000 |
| JP | 2000-201876 | 7/2000 |
| JP | 2000-245670 | 9/2000 |
| JP | 2000-245671 | 9/2000 |
| JP | 2000-245672 | 9/2000 |
| JP | 2000-246187 | 9/2000 |
| JP | 2000-254057 | 9/2000 |
| JP | 2000-254058 | 9/2000 |
| JP | 2000-254059 | 9/2000 |
| JP | 2000-296083 | 10/2000 |
| JP | 2000-296084 | 10/2000 |
| JP | 2000-296085 | 10/2000 |
| JP | 2000-316772 | 11/2000 |
| JP | 3074984 | 11/2000 |
| JP | 2001-299657 | 10/2001 |
| JP | 2001-299658 | 10/2001 |
| JP | 2005-246484 | 9/2005 |
| JP | 2006-141483 A | 6/2006 |

| | | |
|---|---|---|
| WO | WO-92/03083 A1 | 3/1992 |
| WO | WO-97/04701 | 2/1997 |
| WO | WO-98/20987 | 5/1998 |
| WO | WO-01/35334 | 6/2000 |
| WO | WO-00/53407 | 9/2000 |
| WO | WO-00/60992 | 10/2000 |
| WO | WO-00/60993 | 10/2000 |
| WO | WO-00/60994 | 10/2000 |
| WO | WO-01/54872 | 8/2001 |
| WO | WO 01/91606 A1 | 12/2001 |

OTHER PUBLICATIONS

Essentials of Short-Staple Spinning, pp. 79-81, Nov. 1993.
Peter R. Lord, "The Economics, Science and Technology of Yarn Production", pp. 237-239, 1979.
CTI Chinese Textile Dictionary, pp. 120-121, 466, 487, 628, 806-807, 963-964.
Hermann Ludewig, Polyester Fibers Chemistry and Technology, Dec. 1977.
Polyester Fiber.
Translation Certification, executed by Attorney Translation Services, LLC.
Notice of Opposition, dated Oct. 13, 2006.
Translation Certification-2, executed by Attorney Translation Services, LLC.
European Search Report (EP 04 03 0012) mailed Apr. 21, 2005.
Japanese Office Action No. 2005-022141 mailed Jun. 20, 2006.
Japanese Office Action No. 2005-270469 mailed Jun. 20, 2006.

* cited by examiner

CLEANING ARTICLE

This application is a continuation of U.S. application Ser. No. 10/957,552, filed Oct. 1, 2004, now pending which is a continuation of U.S. application Ser. No. 10/070,928,filed Mar. 8, 2002, now U.S. Pat. No. 6,813,801; which is a continuation of U.S. national phase application under 35 U.S.C. §371 of International Patent Application No. PCT/JP01/005840 filed Jul. 5, 2001 which claims benefit of Japanese Application No. 2001-113750, filed Apr. 12, 2001 and Japanese Application No. 2000-208756 filed Jul. 10, 2000. The International Application was published on Jan. 17, 2002 as International Publication No. WO/2002/003847 under PCT Article 21(2) and the content of all of the above applications are incorporated herein in their entirety.

BACKGROUND OF THE INVENTION

1. Field of the Invention

The present invention relates to a disposable cleaning article to be held by a holder and used as a cleaning mop or by a hand and, more particularly, to a cleaning article provided with a brush portion having a high effect to trap dust and a high rigidity.

2. Related Art

In the cleaning article of the conventional mop type for cleaning the room, its brush portion is usually formed of twisted yarns of cotton or the like. However, the cleaning article of this kind is so expensive in manufacturing cost that it is difficult to sold it as a disposable (i.e., single-use) product. In addition, the cleaning article of this kind can absorb dust by an adhesive oil agent such as liquid paraffin, which is applied to the surfaces of the twisted yarns; but the twisted yarns per se are not good in dust trapping power. Therefore, it has a defect in capability of trapping hair or the like.

On the other hand, the cleaning articles as disclosed in Japanese Unexamined Patent Publication Nos. 154791/1997 and 38009/1997 are designed for disposable use. These cleaning articles can be attached to a holder. The former is formed by laminating two sheets of nonwoven fabric to leave their peripheral portions unadhered to each other; and the latter is formed by cutting a peripheral portion of a nonwoven fabric to form a duster portion having long narrow strips.

These cleaning articles, as disclosed in the above-mentioned official gazettes and formed of a nonwoven fabric, are inexpensive and suitable for disposable use. Moreover, they can easily wipe off fine dust. However, the cleaning articles per se are so flat that the capability of trapping relatively large dust is low.

On the other hand, disposable cleaning articles in which a brush portion is formed of fibers are also known in the art. However, since the brush portion is formed only of fibers, the rigidity of the brush portion is lowered. Therefore, the fibers are entangled or curled during the cleaning operation. As a result, the portion to function substantially as the brush portion is compressed to cause a defect that the dust trapping effect of the fibers cannot be sufficiently exhibited.

SUMMARY OF THE INVENTION

The present invention has an object to provide a cleaning article which is provided with a brush portion having a high dust collecting ability and a high shape retention and which can be manufactured at a low cost.

According to a first aspect of the invention, there is provided a cleaning article comprising a brush portion including: a plurality of strips; and at least one layer of a fiber bundle.

This cleaning article can trap fine dust with its fiber bundle layer forming the brush portion, while suppressing the entanglement of the fibers with the strips. In addition, the strips per se can exhibit the cleaning effect. With the strips, moreover, the brush portion is so increased in rigidity as to have a high shape retention against an external force.

For example, this cleaning article may be constructed such that at least one sheet having the plurality of strips formed therein and the fiber bundle layer are stacked on and partially joined to a base material. If they are thus joined, disaggregation or entanglement of fibers forming the fiber bundle layer can be suppressed so that the dust trapping ability of the brush portion is also enhanced at its face adjacent to the base material.

The base material may be a sheet formed with strips. This can enhance the contact with the object to be cleaned, which may have various surface shapes, so that the dust trapping ability can be further improved.

The cleaning article according to the first aspect of the invention may be constructed such that the sheet appears on the outermost face of the cleaning article on its cleaning side. In this construction, since the strips having a relatively high rigidity are positioned on the outermost face, there hardly occurs a phenomenon that fibers of the fiber bundle layer are entangled and fixed during the cleaning operation, so that the cleaning article can stand the use of a long term.

Alternatively, the fiber bundle layer may appear on the outermost face of the cleaning article on its cleaning side, in place of the secondary sheet. In this construction, the fiber bundle layer can conform to the fine irregularities of the object to be cleaned, to thereby have an improved contact. Therefore, the fine dust trapping ability can be improved.

Here, it is preferred that fibers of the fiber bundle layer are fixed to one another over a predetermined length from a portion where the fiber bundle layer is joined to the base material. With the fibers of the fiber bundle layer being fixed to one another over a predetermined length from the joining portion, even if the fiber bundle layer appears on the outermost face, the fibers of the fiber bundle layer can be prevented from being entangle or massed by the friction during the cleaning operation.

It is also possible that another fiber bundle layer is provided such that one fiber bundle layer closer to the base material has a basis weight larger than that of the other fiber bundle layer closer to the outermost face of the cleaning article on its cleaning side. In this construction, the base material can be prevented during the cleaning operation from being exposed on the cleaning side of the cleaning article. In addition, the cleaning article can provide a sufficient cushioning feel during the cleaning operation.

Preferably, the base material is provided on its outer face opposed to the cleaning face with a holding sheet. In this construction, for example, between the outer face of the base material and the holding sheet, there may be formed a holding space into which a hand of a user or a holder is enabled to be inserted.

Moreover, the fiber bundle layer may be joined to the base material at two sides of the holding space extending in a direction along which the hand or holder is permitted to be inserted. In this construction, the object to be cleaned is not affected by the hardness of the holder so that the cleaning article provides a smooth contact feel when used for cleaning operation.

According to a second aspect of the invention, there is provided a cleaning article comprising: at least two sheets, at least one of which has a plurality of strips; and at least two layers of a fiber bundle, wherein the two sheets are overlaid and joined to each other at two joining portions, which define a holding space between the confronting faces of the two sheets, and the two fiber bundle layers are disposed on the cleaning faces, respectively, of the two sheets, and are joined thereto at the two joining portions.

The cleaning article according to the second aspect of the invention can exhibit the cleaning function on both its surface and back. Therefore, it can be used for cleaning operation without any attention to its cleaning side. Moreover, since the cleaning article can be used for cleaning operation firstly with one face and then with the other face, a long life is allowed.

In this construction, too, it is possible that the strips and the fiber bundle layers form a brush portion. Therefore, the cleaning article can trap fine dust while suppressing entanglement of fibers. In addition, the strips per se can exhibit the cleaning effect.

Here, it is possible that some of fibers of the fiber bundle layer are not extended continuously between the two joining portions so as to form fiber brush portions, each extending from one of the two joining portions and having a free end. These fiber brush portions can exhibit dust wiping function to thereby improve the cleaning ability.

For example, the two sheets and the fiber bundle layers may further be joined to one another midway between the two joining portions to divide the holding space into two parallel holding spaces, and the fiber extending direction in the fiber bundle layers may traverse the two holding spaces. In this construction, these holding spaces are preferably opened at their two opposite ends for insertion of the holder.

In the foregoing individual constructions, it is preferred that the fiber bundle layer is partially joined to adjacent strips, at midway positions of the adjacent strips. With this construction, the fiber bundle layer moves together with the strips so that the fiber bundle layer can be prevented from moving independently to have its fibers entangled or massed.

Moreover, it is preferred that a sheet for forming the strips is formed of either a nonwoven fabric comprising thermoplastic fibers or a thermoplastic resin film. Also, it is preferred that the fiber bundle comprises heat-fusible thermoplastic fibers. Here, the sheet having the strips and the fiber bundle layer can be joined to each other easily and quickly by heat-fusing. Especially if the thermoplastic fibers are used for forming the sheet, the nonwoven fabric can be manufactured by a through-air bonding process to have a high rigidity and elasticity.

DESCRIPTION OF THE PREFERRED EMBODIMENTS

As used herein, the term "cleaning article" refers to devices having a brush portion, which are intended to be used for cleaning or sweeping purposes.

As used herein, the term "cleaning face/cleaning side" refers to faces/sides, which are intended to be directed to the object to be cleaned or swept in use.

As used herein, the term "strip" refers to a long narrow piece of a sheet.

As used herein, the term "fiber bundle" refers to a bundle of a number of fibers. Examples of the fibers include filaments, flat yarns, split yarns and the like. Unless otherwise noted, these fibers are not heat-fused to one another in the fiber bundle.

Figure 1:
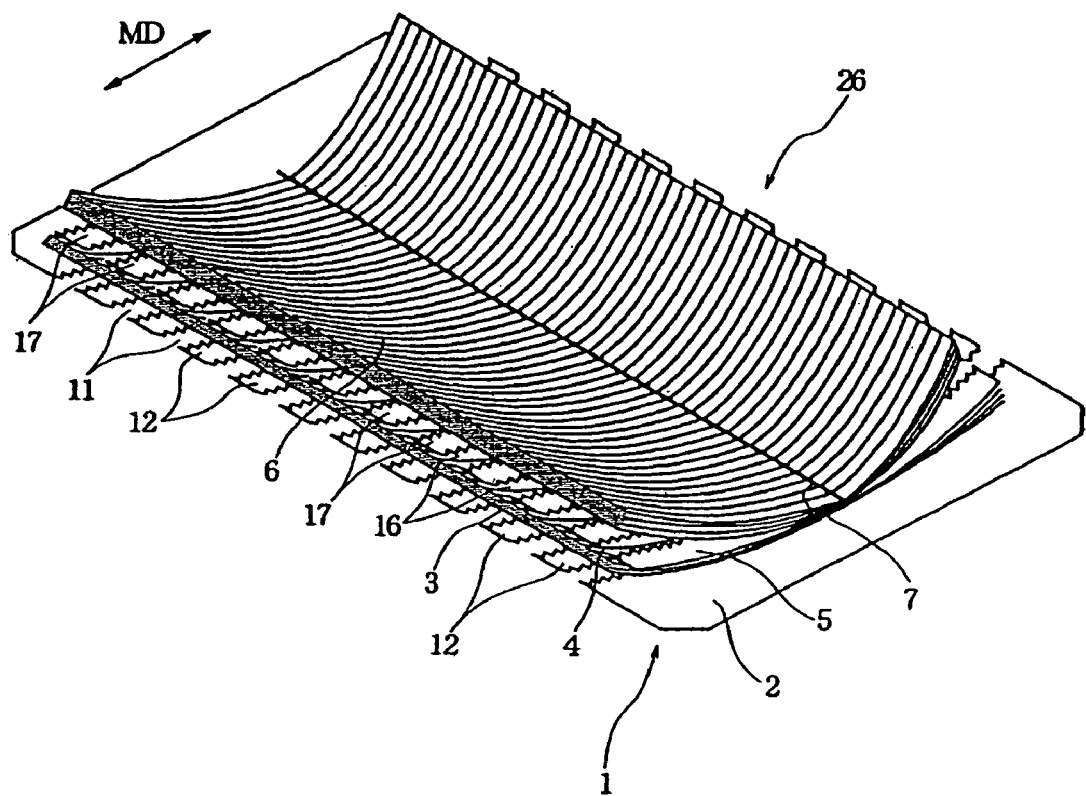
FIG. 1 is a perspective view showing a cleaning article according to a first embodiment of the invention.
Figure 2:
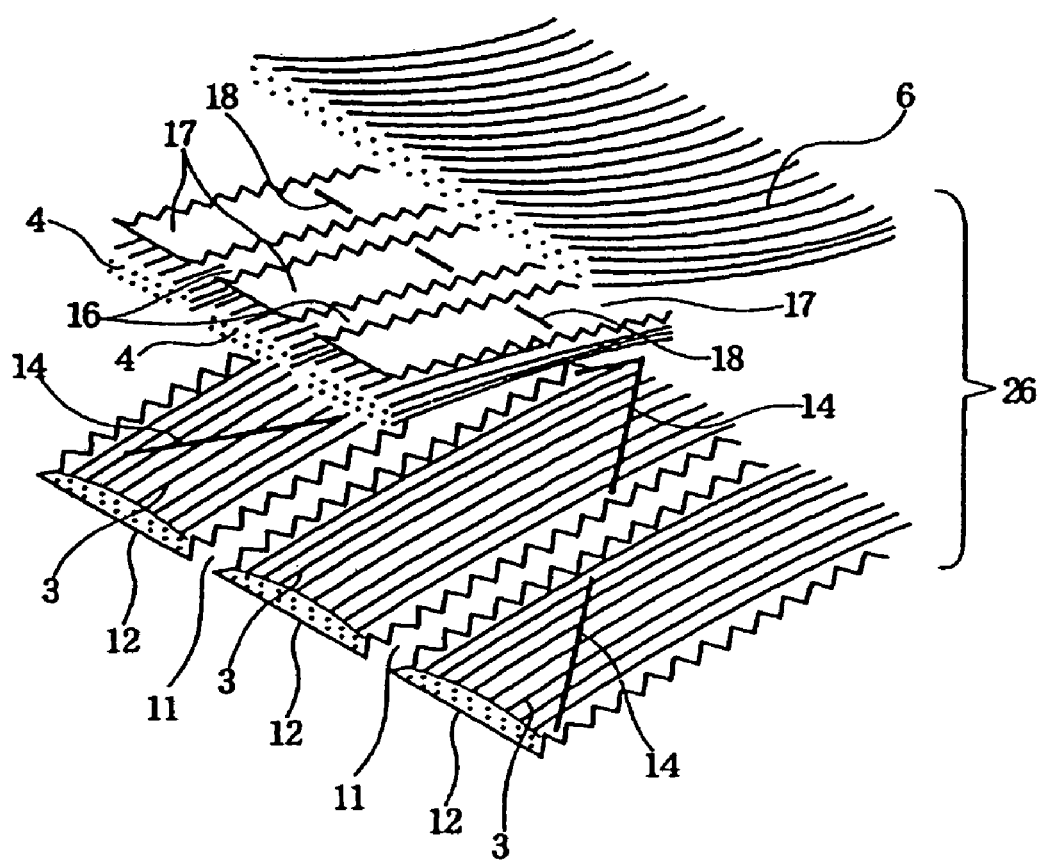
FIG. 2 is a partially enlarged perspective view showing a brush portion of the cleaning article of FIG. 1.
Figure 3:
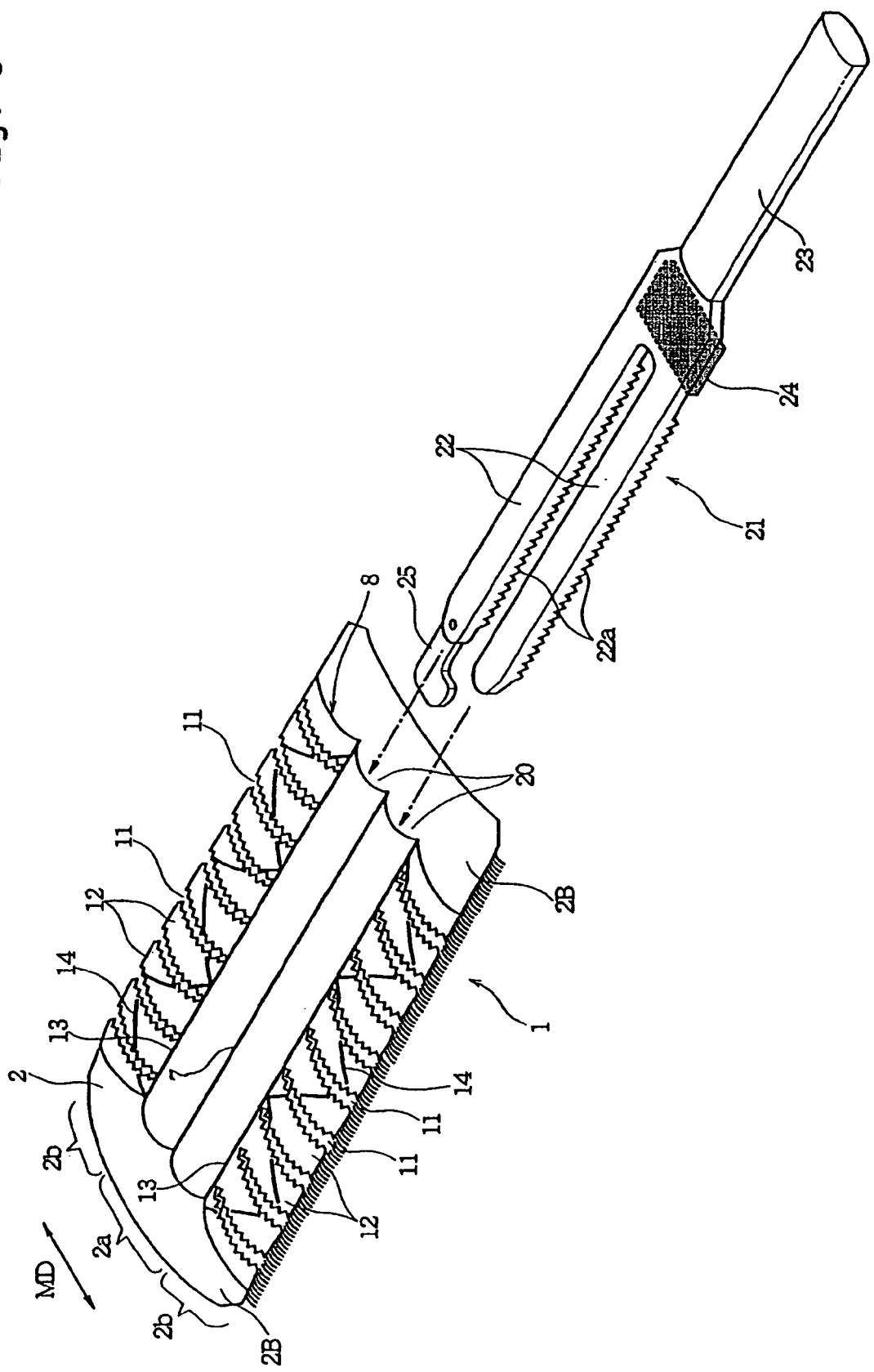
FIG. 3 is a perspective view showing the cleaning article of FIG. 1 from the back side.
Figure 4A:
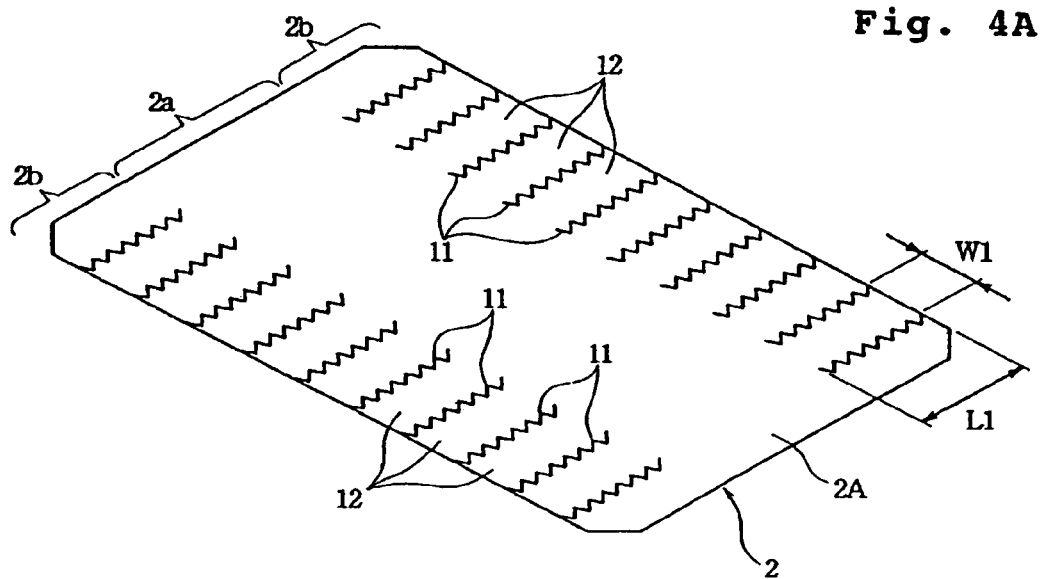
FIGS. 4A and 4B are perspective views showing a base sheet of the cleaning article of FIG. 1 and a laminate of the base sheet and a first fiber bundle layer, respectively.
Figure 4B:
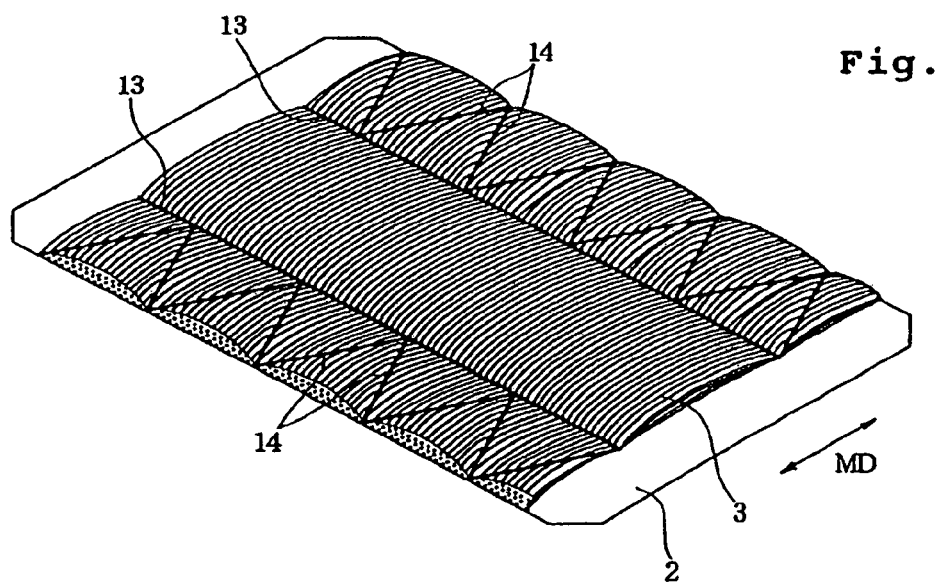
Figure 5:
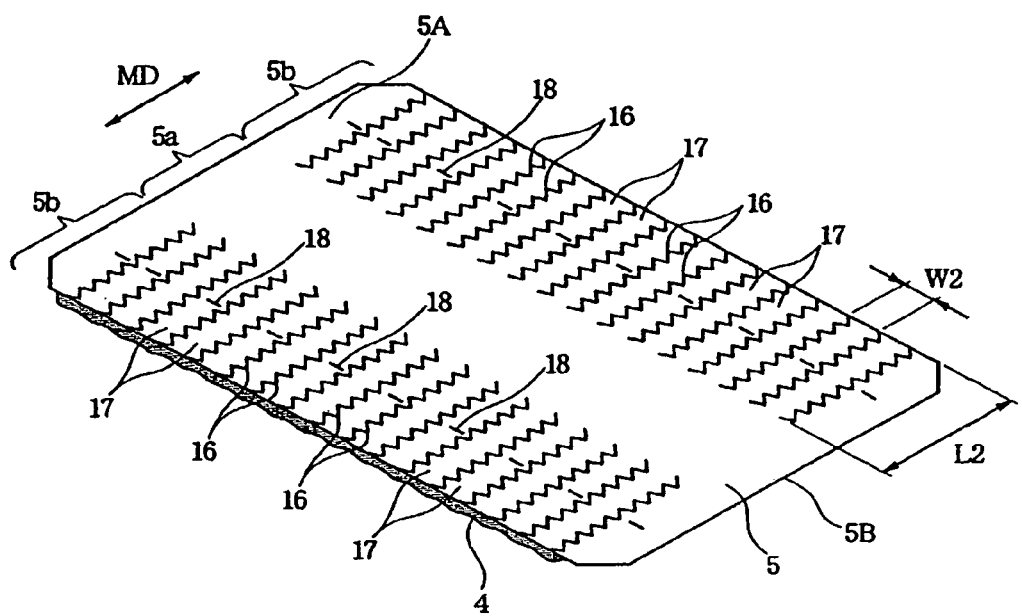
FIG. 5 is a perspective view showing a laminate of a second fiber bundle layer and a secondary sheet of the cleaning article of FIG. 1.
Figure 6:
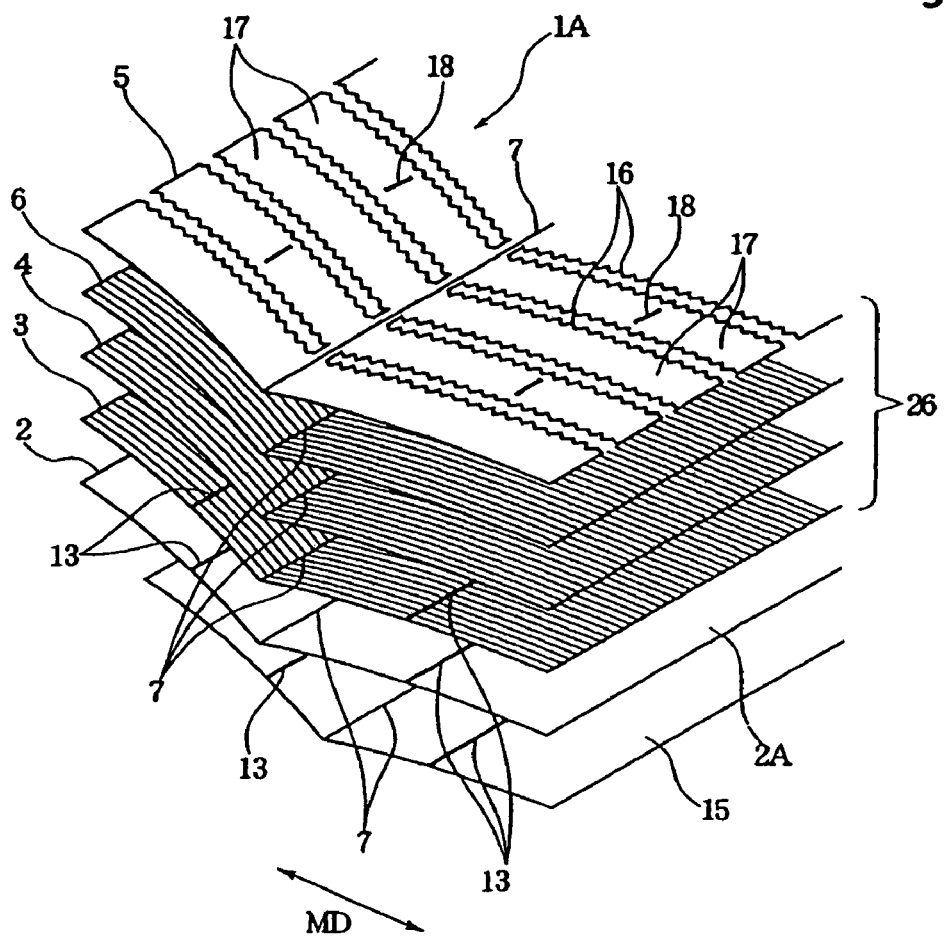
FIG. 6 is a perspective view showing a modification of the cleaning article of the first embodiment.

FIG. 1 is a perspective view showing a cleaning article according to a first embodiment of the invention and taken from the side of a cleaning face; FIG. 2 is a perspective view showing a portion of a brush portion of the cleaning article of FIG. 1 in an enlarged scale; FIG. 3 is a perspective view showing the cleaning article of FIG. 1 from the back side; FIGS. 4A and 4B and FIG. 5 are perspective views showing the cleaning article of FIG. 1 separately of layers; and FIG. 6 is a perspective view showing another layer structure of a cleaning article.

In FIGS. 1 and 2, a cleaning article 1 according to a first embodiment of the invention is shown with its cleaning side upward. The cleaning article 1 comprises a primary sheet (or base sheet) 2, and a first fiber bundle layer 3, a second fiber bundle layer 4, a secondary sheet 5 having strips formed therein, and a third fiber bundle layer 6 laminated subsequently upward on the cleaning face of the base sheet 2. The shorter sides of the cleaning article 1 extend parallel to the feeding direction (or MD) along which materials for the above-mentioned layers are continuously fed on the production line. These individual layers (i.e., the base sheet 2, the first fiber bundle layer 3, the second fiber bundle layer 4, the secondary sheet 5 and the third fiber bundle layer 6) are joined altogether at an all-layer joining line 7 extending perpendicularly to MD.

In the embodiment shown, the base sheet 2 and the sheet 5 are individually formed of a nonwoven fabric formed only of or containing thermoplastic fibers (i.e., heat-fusible fibers). Examples of the thermoplastic fibers include: fibers of PE (polyethylene), PP (polypropylene) or PET (polyethylene terephthalate); and conjugated fibers of PE/PET or PE/PP (e.g., conjugated fibers of a core/sheath structure having a core of PP or PET and a sheath of PE). The nonwoven fabric may be a thermal bonded nonwoven fabric, a spun-bonded nonwoven fabric or a spun-laced nonwoven fabric. Alternatively, the base sheet 2 and the sheet 5 may be formed of a thermoplastic resin film such as a PE film or a PP film. Of course, it is also possible that the base sheet 2 and the sheet 5 are formed of a laminated sheet of a nonwoven fabric and a resin film.

In order to increase the rigidity and elasticity, it is preferred that the base sheet 2 and the sheet 5 are formed of a through-air bonded nonwoven fabric in which the thermoplastic fibers are bonded with heated air. Especially where the sheet 5 is disposed to form the outermost face of the cleaning article on the cleaning side (See FIG. 6), it is desirable that the sheet 5 is formed of a through-air bonded nonwoven fabric.

In the embodiment shown, the first fiber bundle layer 3, the second fiber bundle layer 4 and the third fiber bundle layer 6 individually comprise a bundle of thermoplastic filaments. These individual filaments extend continuously to traverse each fiber bundle layer. Such a fiber bundle layer can be easily formed by opening a tow of filaments. More specifically, each fiber bundle layer can be formed over a sheet by the following steps of: opening a tow of filaments to have a predetermined width and a predetermined thickness (or bulk), while being fed continuously in MD; joining the opened tow onto a continuously fed sheet material; and cutting the tow together with the sheet material at an interval (corresponding to the size of the cleaning article in MD). The filaments may be made of any suitable materials such as PE, PP, PET, Ne (nylon), rayon, or combination thereof. Preferably, the filaments are conjugated fibers of a core/sheath structure having a core of PP or PET and a sheath of PE.

The filaments are preferred to have a fineness of 1 to 50 dtex, more preferably 2 to 10 dtex. Here, the individual fiber bundle layers may contain fibers of different finenesses.

However, the fibers forming the fiber bundle layer of the invention should not be limited to the filaments. For the fiber bundle layer, flat yarns or split yarns may also be employed. The flat yarns are prepared by slitting a film into tapes and by stretching the tapes in the longitudinal direction. The split yarns are prepared by splitting a thermoplastic film in the direction perpendicular to the orientation direction of the resin so that the film is fibrillated and interconnected into a net shape.

Preferably, the fibers forming the fiber bundle layer of the invention are crimped. With the fibers being crimped, the fiber bundle layer becomes so bulky as to take a structure enabled to capture dust easily by the crimped portions. Especially preferred are crimped filaments opened from a tow.

Here will be described the structures of the individual layers forming the cleaning article 1 and the procedure for laminating the layers.

FIG. 4A shows the base sheet 2 which is formed of a spun-bonded nonwoven fabric, a through-air bonded nonwoven fabric, or the like. The base sheet 2 has a central region 2a, and strip-forming regions 2b and 2b lying opposite one another and sandwiching the central region 2a therebetween. On the other hand, FIG. 3 shows the base sheet 2 with its back face 2B upward. Over the back face 2B, there is laid a holding sheet 8 extending from the central region 2a to the strip-forming regions 2b and 2b. In the embodiment shown, the holding sheet 8 is formed, like the base sheet 2, of a nonwoven fabric such as a spun-bonded nonwoven fabric, a through-air bonded nonwoven fabric, or the like. However, the holding sheet 8 may be formed of a resin film. The base sheet 2 and the holding sheet 8 are identical in their sizes in MD, but not identical in their sizes in the direction perpendicular to MD. The holding sheet 8 is shorter than the base sheet 2 in the direction perpendicular to MD.

With the holding sheet 8 being laid over the outer face 2B of the base sheet 2, cut lines 11 in a zigzag shape (or in a saw-tooth shape) are cut in the strip-forming regions 2b and 2b, to form a plurality of strips 12, which are separated from one another by the cut lines 11 and elongated in MD, in the base sheet 2 and the holding sheet 8.

Over a cleaning face 2A of the base sheet 2 having the strips 12, as shown in FIG. 4B, there is laid the first fiber bundle layer 3. At this time, the individual filaments forming the first fiber bundle layer 3 extend in MD, and the first fiber bundle layer 3 has a predetermined bulk over the cleaning face 2A of the base sheet 2.

In such a laminated state, the base sheet 2, the holding sheet 8 disposed on the outer face 2B, and the first fiber bundle layer 3 disposed on the cleaning face 2A are joined together at joining lines 13 and 13 and joining lines 14 and 14. Here, the joining is performed by heat-sealing, ultrasonic sealing or the like, so that the base sheet 2, holding sheet 8 and the first fiber bundle layer 3 are fusion-bonded at the joining lines 13 and 14.

The paired joining lines 13, 13 are formed along the boundary lines between the central region 2a and the strip-forming regions 2b and 2b, so that they extend parallel with one another while being spaced in MD. On the other hand, the joining lines 14, 14 are formed in a zigzag shape (or in a saw-tooth shape) in the strip-forming regions 2b and 2b, respectively.

As a result, as shown in FIG. 2 in an enlarged scale, the individual filaments forming the first fiber bundle layer 3 are joined to the underlying strips 12 at the joining lines 14 extending obliquely transversely over the strips 12 at midway areas between their longitudinal ends. With the joining lines 14, motions of the individual filaments can be restrained so properly that the filaments are prevented from being excessively separated or entangled, while being enabled to move over the strips 12 relatively freely, to thereby exhibit an excellent dust collecting effect.

FIG. 5 shows the state in which the second fiber bundle layer 4 and the sheet 5 are laminated.

The sheet 5 is formed of a spun-bonded or through-air bonded nonwoven fabric, like the base sheet 2, or a resin film. The sheet 5 has the same size and shape as those of the base sheet 2, except for those of strips formed therein.

The sheet 5 has a central region 5a and strip-forming regions 5b and 5b lying opposite one another and sandwiching the central region 5a therebetween. These strip-forming regions 5b and 5b are cut to form a plurality of cut lines 16 extending in a zigzag shape (or in a saw-tooth shape) from the longer side edges of the sheet 5 toward the central portion 5a in MD. Thus, there are formed a plurality of-strips 17 which are separated by the cut lines 16 and elongated in MD.

If the strips 12 of the base sheet 2 shown in FIG. 4A have a length L1 and a width W1 and if the strips 17 of the sheet 5 shown in FIG. 5 have a length L2 and a width W2, L2>L1 and W1>W2 so that the strips 17 are thinner and longer than the strips 12. Here, the individual strips 12 and 17 are formed to have widths of at least 2 mm, preferably widths of 2 to 50 mm and lengths of 10 to 100 mm.

The second fiber bundle layer 4 is laminated on the back face 5B of the sheet 5. In the manufacture process, the back face 5B of the sheet 5 is directed upward, and the second fiber bundle layer 4 is laid over the back face 5B. At this time, the individual filaments forming the second fiber bundle layer 4 extend in MD, and the second fiber bundle layer 4 has a predetermined bulk over the back face 5B of the sheet 5.

In such a laminated state, the strips 17 and the second fiber bundle layer 4 are joined together at joining portions 18 which are positioned midway between longitudinal ends of the strips 17. At these joining portions 18, specifically, the strips 17 and the second fiber bundle layer 4 are fusion-bonded by heat-sealing or ultrasonic sealing. As shown in FIG. 5, the joining portions 18 are formed alternately in every others of strips 17 which are arranged in the direction perpendicular to MD. In other words, the strips 17 with and without the joining portions 18 alternate with each other. However, all the strips 17 may have the joining portions 18.

As shown in a partially enlarged view of FIG. 2, the second fiber bundle layer 4 is joined to the overlying strips 17 at the joining portions 18 positioned midway between the longitudinal ends of the strips 17. Therefore, the second fiber bundle layer 4 is retained in its shape by the strips 17 so that the filaments forming the second fiber bundle layer 4 are prevented from being excessively entangled or curled.

At the final stage of the manufacture process of the cleaning article 1, over the first laminate in which the base sheet 2, the holding sheet 8 and the first fiber bundle layer 3 are laminated and joined, as shown in FIG. 4B, there is laid the second laminate in which the second fiber bundle layer 4 and the sheet 5 are laminated and joined, as shown in FIG. 5. At this lamination, the first and second laminates are laid such that the second fiber bundle layer 4 lies over the first fiber bundle layer 3.

Over the cleaning face 5A of the sheet 5 of the second laminate, moreover, there is laid the third fiber bundle layer 6, as shown in FIG. 1. The individual filaments forming the third fiber bundle layer 6 extend in MD, and the third fiber bundle layer 6 has a substantially homogeneous bulk over the cleaning face 5A of the sheet 5. Then, the holding sheet 8, the base sheet 2, the first fiber bundle layer 3, the second fiber bundle layer 4, the sheet 5 and the third fiber bundle layer 6 are joined altogether into an integral structure at the all-layer joining line 7 which extends in MD along the center line of the cleaning article 1. This all-layer joining line 7 is a fusing seal line by heat sealing, ultrasonic sealing or the like, so that the individual layers are fusion-bonded at the all-layer joining line 7 to be integrated altogether.

As shown in FIGS. 1 and 2, the cleaning article 1 thus constructed has brush portions 26 at right and left sides on the cleaning face 2A of the base sheet 2. These brush portions 26 are formed by an assembly of the strips 12 of the base sheet 2, the first fiber bundle layer 3, the second fiber bundle layer 4, the strips 17 of the sheet 5 and the third fiber bundle layer 6.

When the floor, furniture, or the like is wiped with the cleaning side of the cleaning article 1, which is shown upward in FIG. 1, fine dust can be collected by the third fiber bundle layer 6 appearing on the outermost face of the cleaning article 1, and by the first and second fiber bundle layers 3 and 4 inside of the brush portions 26. Here, the strips 12 and 17 exhibit the function to wipe off the dust, and the dust, as wiped off by the strips 12 and 17, can also be trapped by the fiber bundle layers 3, 4 and 6.

In this embodiment, the strips 17 are interposed between the second fiber bundle layer 4 and the third fiber bundle layer 6. When the cleaning operations are repeated, therefore, the filaments of the second fiber bundle layer 4 and the filaments of the third fiber bundle layer 6 are prevented from being excessively entangled, so that the shape of the brush portions 26 can be retained for a long term.

Moreover, the filaments of the first fiber bundle layer 3 and the filaments of the second fiber bundle layer 4 are partially joined to the strips 12 and the strips 17, respectively, so that they are prevented from being excessively curled or entangled. Even after a cleaning operation for a long period, therefore, the brush portions 26 are hardly crushed so that they are excellent in the shape retention.

On the outer face side of the cleaning article 1 thus completed, as shown in FIG. 3, the base sheet 2 and the holding sheet 8, which are firstly joined at the joining lines 13 and 13, are further joined at the all-layer joining line 17 which is formed midway between the joining lines 13 and 13. In the holding region on the outer face of the central region 2a, therefore, there are formed two parallel holding spaces 20 and 20, each of which is defined between one of the joining lines 13 and the all-layer joining line 7.

Therefore, the cleaning article 1 can be held from the outer face side by a holder 21 of a bifurcated structure, as shown in FIG. 3. This holder 21 includes bifurcated insert portions 22 and 22 and a grip portion 23. The insert portions 22 and 22 are inserted into the holding spaces 20 and 20. Thus, the cleaning operation can be performed by holding the grip portion 23.

It is possible to adopt a variety of structures for preventing the cleaning article 1 from easily coming out of the holder 21 at the cleaning time.

First, the insert portions 22 and 22 may be formed on their lower faces with a number of saw-tooth shaped protrusions 22a, which are arranged finely with sharp edges. With the protrusions 22a being directed toward the base sheet 2, the insert portions 22 and 22 are inserted into the holding spaces 20 and 20. In this inserted state, the saw-tooth shaped protrusions 22a and the base sheet 2 are retained in a high coefficient of friction so that they can prevent the cleaning article 1 from easily coming out.

It is also effective to fix a retaining fastener 24 on the root end portion of the insert portions 22 and 22 of the holder 21. This retaining fastener 24 is formed with fine hook-shaped or mushroom-shaped projections. With the retaining fastener 24 being retained on the back face 2B of the base sheet 2, the cleaning article 1 is prevented from coming out of the holder 21.

Moreover, it is also possible to provide a pivotable connect member 25 to the leading end portion of one of the bifurcated insert portions 22. This connect member 25 is turned, when the insert portions 22 and 22 are inserted so far into the holding spaces 20 and 20 that their leading ends pass through and come out of the holding spaces 20 and 20, to thereby retain the connect member 25 on the leading end of the other insert portion 22 by engagement between concave and convex, or the like. The prevention of the cleaning article 1 from coming out of the holder 21 can also be ensured by this retention.

To the holder 21, there may be provided all or at least one of the means for preventing the coming-out of the cleaning article 1 (i.e., all or at least one of the protrusions 22a, the retaining fastener 24 and the connect member 25). Here, the holder 21 having such means can be used not only in the cleaning article of the invention but also in any cleaning article.

The cleaning article 1 thus far described has a symmetrical shape, as shown in FIG. 3. Therefore, if the cleaning article 1 is used for cleaning operation while being attached to the holder 21 from the direction shown in FIG. 3 and is locally soiled, the cleaning article 1 may be removed from the holder 21 and turned 180 degrees from the position shown in FIG. 3 to be attached to the holder 21 again. If the cleaning article 1 is used for cleaning operation by changing its direction thus described above, the individual portions of the cleaning article 1 can be homogeneously used without any unbalance.

Here, if the insert portions 22 of the holder 21 are formed of an easily deformable material, it is possible to bend arbitrarily the shape of the cleaning article 1 held by the holder 21. If the grip portion 23 is given an extensible structure, on the other hand, the cleaning operation may be performed while the grip portion 23 being extended long.

Here in the cleaning article 1, the first fiber bundle layer 3 is joined to the base sheet 2 at the joining lines 13 and 13, as shown in FIG. 4B, so that the cleaning faces of the insertion portions 22 and 22 to be inserted into the holding spaces 20 and 20 are covered at any time not only with the base sheet 2 but also with the first fiber bundle layer 3. Therefore, even if the right or left brush portion is unintentionally turned over during cleaning operation, the first fiber bundle layer 3 exists at a predetermined sufficient thickness between the object to be cleaned and the insertion portions 22 and 22 of the holder 21. As a result, the object to be cleaned is not affected by the hardness of the holder so that the cleaning article 1 provides a smooth contact feel when used for cleaning operation.

FIG. 6 is a perspective view showing a cleaning article 1A as a modification of the first embodiment of the invention.

The cleaning article 1A shown in FIG. 6 is prepared by changing the order of laminations of the individual layers of the cleaning article 1 shown in FIGS. 1 to 5.

In this cleaning article 1A, there is provided an outermost base sheet 15 which is formed of a through-air bonded nonwoven fabric, and the base sheet 2 formed of a spunbonded nonwoven fabric or the like is laid over the cleaning face of the this outermost base sheet 15. Over the cleaning face 2A of the base sheet 2, moreover, there are laid the first fiber bundle layer 3, the second fiber bundle layer 4, the third fiber bundle layer 6 and the sheet 5 sequentially upward. The sheet 5 is formed with the strips 17 and appears on the outermost face of the cleaning article 1A on its cleaning side. The sheet 5 may be formed of any suitable material such as a nonwoven fabric or a resin film, but is preferably formed of a through-air bonded nonwoven fabric.

Then, the outermost base sheet 15, the base sheet 2 and the first fiber bundle layer 3 are joined to one another on the same joining lines 13 and 13 as those shown in FIG. 4B. Moreover, all the layers from the outermost base sheet 15 to the sheet 5 having the strips 17 are joined altogether at the same all-layer joining line 7 as that shown in FIGS. 1 and 2. This all-layer joining line 7 extends along the center line of the cleaning article 1A.

Here, as in the structure shown in FIG. 5, the third fiber bundle layer 6 and the overlying sheet 5 may be joined at the joining lines 18 positioned midway between the longitudinal ends of the strips 17 so that some of the filaments of the third fiber bundle layer 6 are partially integrated to the strips 17. Moreover, the base sheet 2 maybe formed with the plurality of strips 12, as in FIG. 4A, and the strips 12 and the first fiber bundle layer 3 may also be joined at the zigzag joining lines 14, as in FIG. 4B.

Of course, it is also possible that the holding sheet 8 is joined to the outer face of the outermost base sheet 15, as in FIG. 3, to form the holding spaces 20 and 20 between the outermost base sheet 15 and the holding sheet 8.

In the cleaning article 1A shown in FIG. 6, the sheet 5 having the strips 17 is provided to form the outermost face on the cleaning side so that it abuts preferentially against the object to be cleaned, such as floor, furniture or the like. Therefore, it is possible to prevent the filaments of the individual underlying fiber bundle layers 3, 4 and 6 from being excessively entangled or massed by the friction with the object to be cleaned. Especially if some of the filaments of the third fiber bundle layer 6 are joined at the joining lines 18 to the overlying strips 17, they are hardly entangled or massed. If the outermost sheet 5 is formed of a highly rigid and soft through-air bonded nonwoven fabric, moreover, the brush portions 26, as formed of the strips and the fiber bundle layers, are hardly deformed by the friction with the object to be cleaned, so that they hardly lose their shapes even after used for a long term.

When the sheet 5 having the strips 17 forms the outermost face of the cleaning article on its cleaning side, as shown in FIG. 6, it is the more preferable that the individual strips 17 are the longer. It is, therefore, preferred that the cut lines 16 for separating the strips 17 are extended to or close to the all-layer joining line 7. Alternatively, it is also possible that the cut lines 16 cross the whole area of the sheet 5 in MD so that the strips 17 are completely separated from each other before joined to the other layers at the all-layer joining line 7.

As has been described above, if the strips 17 formed of the through-air bonded nonwoven fabric are positioned on the outermost face of the cleaning article on its cleaning side, as in the embodiment shown in FIG. 6, the brush portions 26 can reliably retain their shapes even after use of a long term. On the other hand, if the fiber bundle layer is positioned on the outermost face of the cleaning article on its cleaning side, as in the embodiment shown in FIGS. 1 to 5, the filaments of the fiber bundle layer are liable to be entangled or massed by the friction with the object to be cleaned for a long term, comparatively.

In the cleaning article 1 shown in FIGS. 1 to 5, therefore, it is preferred to apply a fixing agent to the third fiber bundle layer 6 appearing on the outermost face. Examples of the fixing agent include an oil agent, a wax, and a resin such as a HMA (hot melt adhesive). This fixing agent thus applied can prevent freedom of movement of the filaments (i.e., suppress disaggregation of the filaments) so that the filaments can be prevented from being excessively entangled or massed at the wiping time.

This fixing agent may be partially applied to the third fiber bundle layer 6. For example, the fixing agent may be sprayed exclusively to the cleaning face of the third fiber bundle layer 6 thereby to fix the filaments appearing on the cleaning face of the third fiber bundle layer 6 exclusively. Alternatively, the fixing agent may be applied to the third fiber bundle layer 6 over a predetermined length from the all-layer joining line 7 so that the filaments forming the third fiber bundle layer 6 remain free on the side of their free ends. In both cases, the filaments forming the third fiber bundle layer 6 can be prevented from being excessively entangled, without lowering the dust trapping effect by the fiber bundle layer 6. Preferably, the fixing agent is solid at the room temperature.

In the case where a wax is used for fixing, for example, the ratio of the wax to the fiber bundle layer 6 is preferably from 0.5 to 25% by weight. If the ratio is less than 0.5% by weight, the entanglement of the filaments could not be prevented effectively. If more than 25% by weight, on the other hand, the filaments will be excessively firmly fixed. Therefore, since the filaments can not be sufficiently raised, the dust trapping effect is lowered.

In the case where a HMA is used for fixing, this HMA is preferred to have a low viscosity. If a HMA having a high viscosity is used, dust trapping property is enhanced but the filaments are liable to be entangled. Of course, the fixing agent may be prepared by mixing a wax and a HMA having a low viscosity.

Here, the entanglement of the filaments may be prevented not by the method of applying the fixing agent to the fiber bundle layer 6 but by solidifying the filaments of the fiber bundle layer 6 again after melting them with a solvent or by a heat. In this case, too, it is possible to firmly fix the filaments of the fiber bundle layer 6 only at the side of the all-layer joining line 7 to prevent the entanglement, while leaving the degree of freedom at the side of their leading ends so that the filament can be raised easily.

Of course, the fixing of filaments in each fiber bundle layer should not be limited to the cleaning article 1. For example, also in the cleaning article 1A shown in FIG. 6, the filaments in the individual fiber bundle layers 4 and 6 may be fixed to one another with a fixing agent or by fusing them, as has been described above.

In the cleaning article 1 shown in FIG. 1, the third fiber bundle layer 6 is joined to the other layers only at the all-layer joining line 7. However, it is also possible to form other joining lines spaced apart from the all-layer joining line 7 to thereby join the third fiber bundle layer 6 only to the underlying sheet 5 or to all the other layers (i.e., from the sheet 5 to the base sheet 2). This can also prevent the filaments of the third fiber bundle layer 6 from being excessively entangled or massed.

In both the cleaning article 1 shown in FIG. 1 and the cleaning article 1A shown in FIG. 6, it is preferable that the basis weight of the first fiber bundle layer 3 the closest to the base sheet 2 is larger than those of the overlying second fiber bundle layer 4 and third fiber bundle layer 6. In such a construction, even if the strips or the filaments forming the brush portions 26 are entangled or massed by repeating the cleaning operations for a long term, the base sheet 2 is not exposed from the brush portions 26. Therefore, the base sheet 2 can be prevented from coming into direct contact with the object to be cleaned.

Figure 7:
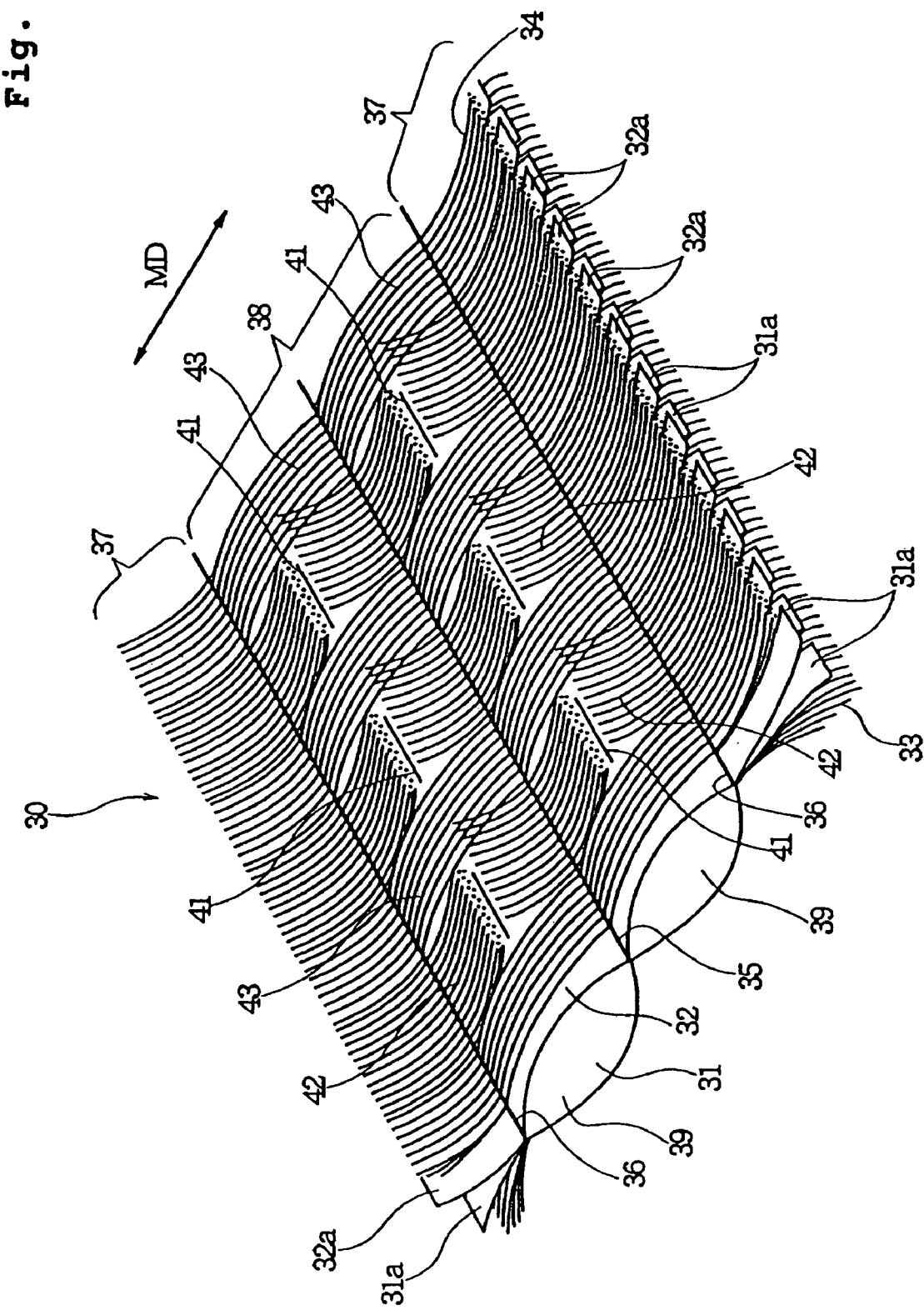
FIG. 7 is a perspective view showing a cleaning article according to a second embodiment of the invention.
Figure 8:
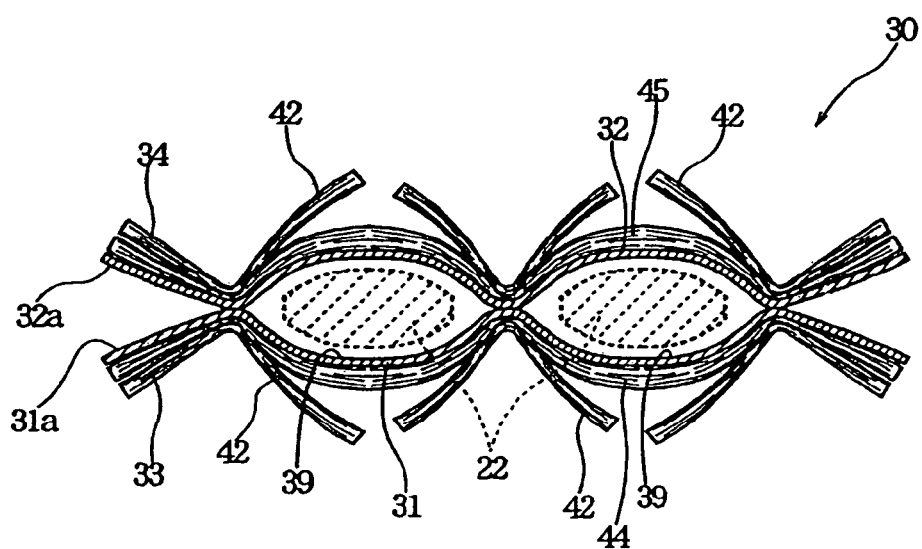
FIG. 8 is a sectional view of the cleaning article of FIG. 7.

FIG. 7 is a perspective view showing a portion of a cleaning article 30 according to a second embodiment of the invention, and FIG. 8 is a sectional view of the cleaning article 30.

The cleaning article 30 comprises sheets 31 and 32 formed of a nonwoven fabric or the like, and fiber bundle layers 33 and 34. The sheet 31 has a plurality of strips 31a formed on its two side portions and elongated in MD. The sheet 32 laid over the sheet 31 also has a plurality of strips 32a formed on its two side portions. These strips 31a and 32a are formed by forming a plurality of cut lines in the two side portions of the individual sheets 31 and 32.

The fiber bundle layer 33 is disposed on the lower face (cleaning face) of the sheet 31; and the fiber bundle layer 34 is disposed on the upper face (cleaning face) of the sheet 32. The sheets 31 and 32 and the fiber bundle layers 33 and 34 thus laminated are integrally fusion-bonded at a center joining line 35 and side joining lines 36 and 36. On the outer side portions beyond the side joining lines 36 and 36, there are formed brush portions 37 and 37 of assemblies of the strips 31a and 32a and the fiber bundle layers 33 and 34.

The two side joining lines 36 and 36 define a holding region 38 therebetween. In the holding region 38, two holding spaces 39 and 39 separated by the center joining line 35 are formed between the sheet 31 and the sheet 32. Into those holding spaces 39 and 39, there can be inserted the insert portions 22 and 22 of the holder 21 shown in FIG. 3. Alternatively, a relatively wide, single holding space may be formed between the side joining lines 36 and 36 without providing the center joining line 35. Here, the holder to be inserted into the wide holding space may be given a flat shape.

In the holding region 38, moreover, there are formed cut lines 41 each extending in the direction perpendicular to MD. Midway between adjacent joining lines 35 and 36, these cut lines 41 are arranged intermittently at a predetermined spacing. The sheets 31 and 32 and the fiber bundle layers 33 and 34 are cut altogether at those cut lines 41.

As a result, on both the upper and lower faces (i.e., two cleaning faces) of the cleaning article 30, filaments crossing the cut lines 41 are cut in the holding region 38, thereby to form fiber brush portions 42 extending from the joining lines 35 and 36. On the other hand, filaments not crossing the cut lines 41 remain uncut in the holding region 38, thereby to form fiber bridges 43 extending between adjacent joining lines 35 and 36. These fiber brush portions 42 and fiber bridges 43 are alternated in the direction perpendicular to MD.

In this cleaning article 30, the brush portions 37 and 37 on its two side portions are the assemblies of the fiber bundle layers 33 and 34 and the strips 31a and 32a. Therefore, the brush portions 37 have such high overall rigidities that the strips 31a and 32a can wipe off the dust whereas the fiber bundle layers 33 and 34 can trap the dust.

In the holding region 38, on the other hand, the fiber brush portions 42, as formed by cutting the fiber bundle layers 33 and 34 at the cut lines 41, can exhibit the function to wipe off the dust, and the fiber bridges 43 can trap the dust wiped off. Therefore, the cleaning article 30 can exhibit the cleaning function not only at the brush portions 37 and 37 but also at both the upper and lower faces in the holding region 38, so that it can perform an effective cleaning operation at any portions.

As shown in FIG. 8, it is also possible to provide other layers 44 and 45 between the sheet 31 and the fiber bundle layer 33 having the fiber brush portions 42 and between the sheet 32 and the fiber bundle layer 34 having the fiber brush portions 42, respectively. These layers 44 and 45 are not cut at the cut lines 41 and may be formed of a fiber bundle having a large basis weight or a through-air bonded nonwoven fabric.

Figure 9:
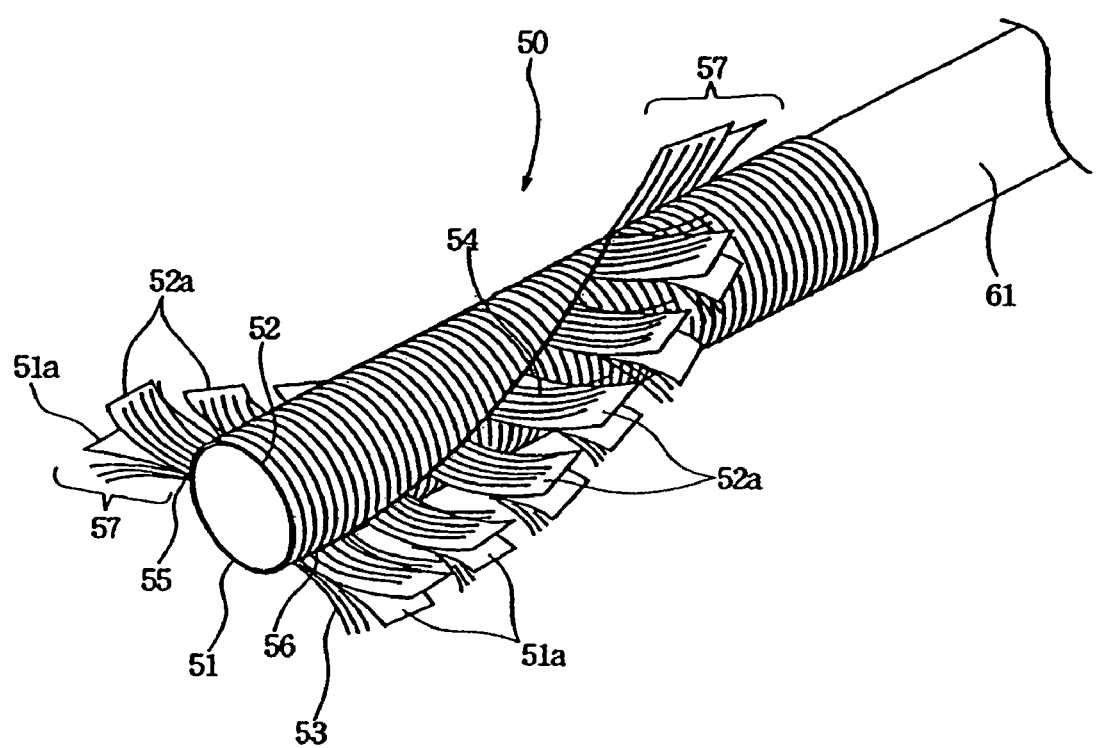
FIG. 9 is a perspective view showing a modification of the cleaning article of the second embodiment.

FIG. 9 is a perspective view showing a cleaning article 50 according to a third embodiment of the invention.

In this cleaning article 50, two side portions of a sheet 51 are cut at a plurality of cut lines to form a plurality of strips 51a, and two side portions of a sheet 52 are cut likewise to form a plurality of strips 52a. On the lower face of the sheet 51, there is disposed a fiber bundle layer 53, and on the upper face of the sheet 52, there is disposed a fiber bundle layer 54. The sheet 51, the sheet 52, the fiber bundle layer 53 and the fiber bundle layer 54 are integrally fusion-bonded at joining lines 55 and 56 extending in parallel.

On the two side portions beyond the joining lines 55 and 56, there are formed brush portions 57 of assemblies of the strips 51a, the strips 52a, the fiber bundle layer 53 and the fiber bundle layer 54.

The joining line 55 and the joining line 56 define a holding space between the sheet 51 and the sheet 52. Into this holding space, there is inserted a holder 61. At this time, if the cleaning article 50 is attached to the holder 61 while being twisted, the brush portions 57 can be deformed to extend helically.

In this cleaning article 50, the brush portions 57 are directed in all directions around the holder 61. Therefore, the cleaning article 50 can effectively trap dust when used to clean a narrow gap or the like.

Here, the embodiment of FIG. 7 may be given a structure in which a fiber bundle layer is further clamped between the strips 31a of the sheet 31 and the strips 32a of the sheet 32. Likewise, the embodiment shown in FIG. 9 may also be given a structure in which a fiber bundle layer is further clamped between the strips 51a of the sheet 51 and the strips 52a of the sheet 52.

In the embodiments of FIGS. 7 and 9, moreover, the strips and the fiber bundle layers may be partially joined to one another midway between the longitudinal ends of the strips.

In the foregoing individual embodiments, if the fiber bundle layers are formed of crimped fibers, the fibers themselves can trap the dust easily. If the fibers (e.g., filaments opened from a tow or split yarns) are joined to the sheet while being stretched in MD, and are then cut together with the sheet, moreover, the fibers are crimped so that the portions of the fiber bundle layer forming the brush portions become shorter than the strips. In this construction, it is possible to enhance both the dust trapping function by the crimped fibers and the dust wiping function by the strips extending beyond the free ends of the crimped fibers, so that the cleaning function can be effectively exhibited by the assembly of the fibers and the strips.

Moreover, the dust adsorbing and trapping effect can be enhanced by applying a dust-adsorbing agent to the fiber bundle layers and/or the strips. This dust-adsorbing agent is exemplified by a surface-active agent, mineral oil or wax. It is also possible to apply an acrylic adhesive or a hot melt adhesive which has a weakened adhesion.

The fiber bundle layers and/or the strips may further contain a substance such as a deodorant, a humectant or an anti-fungus agent in addition to the dust-adsorbing agent.

If the sheets in the individual embodiments are given an elastic stretchability between the joining lines formed in the holding region, moreover, the sheets can make close contact with the holder when the cleaning article is attached to the holder, so that the cleaning article hardly comes out of the holder.

In the individual embodiments, the nonwoven fabric to be used to form the sheets having the strips should not be limited to one formed by the spun-bonding process or the through-air bonding process, but may be formed by the thermal bonding, spun-lacing, point-bonding, melt-blowing, stitch bonding, chemical bonding, needle punching or the like. Moreover, the nonwoven fabric may be replaced by a material to be worked into the strips, such as urethane, sponge, a woven fabric, a net or a split cloth.

Where the sheets having the strips are formed of a nonwoven fabric, the nonwoven fabric is preferred to have a basis weight of 10 to 100 $g/m^2$ and a thickness of 0.5 to 5 mm, from the point of view of handleability when combined with the fiber bundle layers and from the point of view of processing technique. Moreover, the nonwoven fabric is preferred to have a width of 80 to 250 mm in MD.

As has been described above, the cleaning article of the invention has a brush portion formed of strips and a fiber bundle layer, so that the fibers of the fiber bundle layer can be prevented from being excessively entangled or curled, thereby to enhance the shape retention of the brush portion. Especially, if the strips and the fiber bundle layer are partially joined to one another, the fiber bundle layer forming the brush portion can be enhanced in rigidity and can be prevented from being curled or shrunken even after use of a long term.

Although various exemplary embodiments have been shown and described, the invention is not limited to the embodiments shown. Therefore, the scope of the invention is intended to be limited solely by the scope of the claims that follow.

What is claimed is:

1. A cleaning article comprising:
    a soft and fusible base sheet having a plurality of cut lines extending inward from an edge of the sheet, such that a plurality of strips are formed between adjacent cut lines;
    a fiber bundle layer including fusible filaments, wherein the fiber bundle layer is located on one side of the base sheet and extends across the plurality of strips to the edge of the base sheet;
    a first joining portion that joins the fiber bundle layer to the base sheet and that extends through a surface of said fiber bundle layer, said surface being the surface furthest from said base sheet;
    at least one second joining portion that joins some of the filaments of the fiber bundle layer to the sheet and that does not extend to the surface of said fiber bundle layer, said surface being the surface furthest from said base sheet; and
    a brush portion defined by the plurality of strips and the fiber bundle layer extending across the plurality of strips.

2. The cleaning article according to claim 1, wherein the base sheet comprises a strip-forming region defined within the sheet to include the plurality of strips and a strip-non-forming region defined by a region of the sheet where the plurality of strips are not formed, wherein the fiber bundle layer is located on one side of the sheet, across both the strip-forming region and the strip-non-forming region.

3. The cleaning article according to claim 1, wherein the at least one second joining portion is disposed to be spaced apart from the first joining portion to prevent the filaments of the fiber bundle layer from being excessively entangled or massed.

4. The cleaning article according to claim 1, wherein the at least one second joining portion is continuously disposed in a direction to cross the filaments within the fiber bundle layer.

5. The cleaning article according to claim 1, wherein the first joining portion includes a joining line that extends in a direction to cross the filaments within the fiber bundle layer.

* * * * *